UNITED STATES PATENT OFFICE.

ARNO BEHR, OF JERSEY CITY, NEW JERSEY.

METHOD OF MANUFACTURING CRYSTALLIZED ANHYDRIDE OF GRAPE-SUGAR FROM A WATERY SOLUTION OF GRAPE-SUGAR.

SPECIFICATION forming part of Letters Patent No. 256,622, dated April 18, 1882.

Application filed February 22, 1882. (No specimens.)

*To all whom it may concern:*

Be it known that I, ARNO BEHR, of Jersey City, New Jersey, have invented a Method of Manufacturing Crystallized Anhydride of Grape-Sugar from a Watery Solution of Grape-Sugar, of which the following is a specification.

My invention relates to the manufacture of crystallized anhydride of grape-sugar from grape-sugar of comparatively low grade.

I have heretofore devised a method of manufacturing crystallized andydride of grape-sugar from a watery solution of grape-sugar of high grade, which forms the subject of Letters Patent of the United States No. 250,333, issued to me December 6, 1881. In the process described in the said patent it is required that the watery solution shall be formed from grape-sugar of upward of ninety-five per cent. in purity. To obtain grape-sugar of this degree of purity it is necessary to refine it, and in Letters Patent of the United States No. 250,334, issued to me December 6, 1881, I described a method of refining grape-sugar, which consists in forming a solution of ordinary commercial grape-sugar containing only about fifteen per cent. of water, and in stirring into such solution a minute quantity of finely-divided crystallized anhydrous grape-sugar previously prepared, and in subsequently depositing the hot mass in molds, and cooling it to the proper temperature to allow thorough crystallization to take place, and in then draining the hard mass of crystals preferably in a centrifugal machine.

My present process is based upon my discovery that from a watery solution of grape-sugar of less than ninety-five purity a crystallization of anhydrous grape-sugar can also be obtained without the introduction of anhydrous crystals previously prepared, by properly concentrating the watery solution and keeping it at a somewhat elevated temperature for a comparatively long period of time.

The advantage of forming anhydrous crystals is that the mass of crystallized anhydrous grape-sugar can be readily drained, because the anhydrous crystals are in the form of needles or prisms, and do not pack so closely as the crystals of hydrate of grape-sugar.

My present process is applicable to ordinary commercial grape-sugar, which contains upward of eighty-five parts of pure grape-sugar in a hundred parts of dry substance.

In carrying out my process I form a watery solution of grape-sugar of, say, ninety purity and concentrate it until it contains only about thirteen per cent. of water. I then fill it into molds placed in a room the temperature of which is kept at about 90° Fahrenheit. After being for some time maintained at this temperature, crystals of anhydrous grape-sugar begin to form throughout the mass, and in from one to two weeks the mass is ready to be drained, which is preferably done by introducing the molds into a centrifugal machine and draining and purging the mass in the ordinary way.

It will be understood that in my present process the conditions of concentration and temperature are substantially the same as in my previously-described process, but that in the present case greater time is allowed for the completion of the crystallization. It will be found that the time required for complete crystallization will vary according to the purity of the grape-sugar in solution. The lower the grade of the grape-sugar the longer the time which will be required for complete crystallization.

In my present process, as in the processes I have described in my previous patents, to which reference is herein made, crystallized hydrate is to be carefully excluded from the mass during the process of crystallization. Thus, for example, if some particles of crystallized hydrate should be contained in the receptacles in which the concentrated solution is placed, there would be a further formation of crystallized hydrate, and a mixed crystallization of hydrate and anhydride would be the result. If a small portion of minutely-divided crystallized anhydrous grape-sugar is deposited in the receptacles in which the concentrated solution is placed, and the hydrate is excluded, the solution will rapidly crystallize in the form of anhydride of grape-sugar, as set forth in Letters Patent of the United States No. 250,334, for a method of refining grape-sugar, issued to me December 6, 1881. In my present process I omit the introduction of previously-prepared crystals and prolong the period of crystallization, and thereby obtain crystals of anhydrous grape-sugar which are larger than those resulting from the rapid crystallization induced by the presence of previously-prepared anhydrous crystals.

It will of course be understood that in carrying out the process which forms the subject of my present invention I may commence by manufacturing grape-sugar by any of the ordinary methods, and may treat the resulting product as herein set forth, or I may treat ordinary commercial grape-sugar already manufactured by dissolving or melting it and proceeding as herein set forth.

I claim as my invention—

The process of manufacturing crystallized anhydrous grape-sugar herein described, which consists in concentrating a watery solution of grape-sugar of a purity between eighty-five and ninety-five until it contains only about thirteen per cent. of water, and in introducing such solution into molds of ordinary construction, and keeping it, while in the molds, in a room in which the temperature is maintained at about 90° Fahrenheit for from one to two weeks, or until thorough crystallization has taken place, and in then expelling the liquid from the crystallized product by means of a centrifugal machine, in which the molds are placed.

ARNO BEHR.

Witnesses:
M. Q. ADAMS,
W. G. HALSEY.